(12) United States Patent
Chen et al.

(10) Patent No.: US 6,412,004 B1
(45) Date of Patent: *Jun. 25, 2002

(54) METASERVER FOR A MULTIMEDIA DISTRIBUTION NETWORK

(75) Inventors: Ling Tony Chen, Cupertino; Dawson Frank Dean, Piedmont, both of CA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/826,480

(22) Filed: Mar. 27, 1997

(51) Int. Cl.[7] .................. G06F 15/16; G06F 15/173
(52) U.S. Cl. .................. 709/226; 709/203; 709/219; 709/231
(58) Field of Search .................. 345/327, 328; 348/7, 8, 9, 10, 11, 12; 709/219, 226, 223, 224, 231, 241, 244, 104, 105, 239, 200, 202, 227

(56) References Cited

U.S. PATENT DOCUMENTS

| | | | |
|---|---|---|---|
| 5,426,427 A | * 6/1995 | Chinnock et al. | 709/239 |
| 5,487,167 A | 1/1996 | Dinallo et al. | 395/650 |
| 5,557,724 A | * 9/1996 | Sampat et al. | 345/327 |
| 5,577,258 A | 11/1996 | Cruz et al. | 395/800 |
| 5,594,911 A | 1/1997 | Cruz et al. | 395/800 |
| 5,596,719 A | * 1/1997 | Ramakrishnan et al. | 395/200.71 |
| 5,687,372 A | * 11/1997 | Hotea et al. | 709/200 |
| 5,712,981 A | * 1/1998 | McKee et al. | 395/200.71 |
| 5,717,854 A | * 2/1998 | Egawa et al. | 709/219 |
| 5,719,786 A | * 2/1998 | Nelson et al. | 395/200.49 |
| 5,724,355 A | * 3/1998 | Bruno et al. | 395/200.61 |
| 5,761,663 A | * 6/1998 | Lagarde et al. | 709/202 |
| 5,764,899 A | * 6/1998 | Eggleston et al. | 348/7 |
| 5,774,668 A | * 6/1998 | Choquier et al. | 709/227 |
| 5,862,339 A | * 1/1999 | Bonnaure et al. | 709/227 |
| 5,956,488 A | * 9/1999 | Suzuki | 709/219 |
| 5,978,577 A | * 11/1999 | Rierden et al. | 707/10 |

* cited by examiner

Primary Examiner—Robert B. Harrell
Assistant Examiner—Almari Romero
(74) Attorney, Agent, or Firm—Lee & Hayes, PLLC

(57) ABSTRACT

A metaserver for managing the delivery of multimedia streams from, a plurality of multimedia servers to multiple clients over a diverse network is disclosed. The metaserver allows one to eliminate the bottleneck problem associated with the limited speed of a single multimedia server, reduce the network congestion and increase the fault tolerance of the whole system.

31 Claims, 8 Drawing Sheets

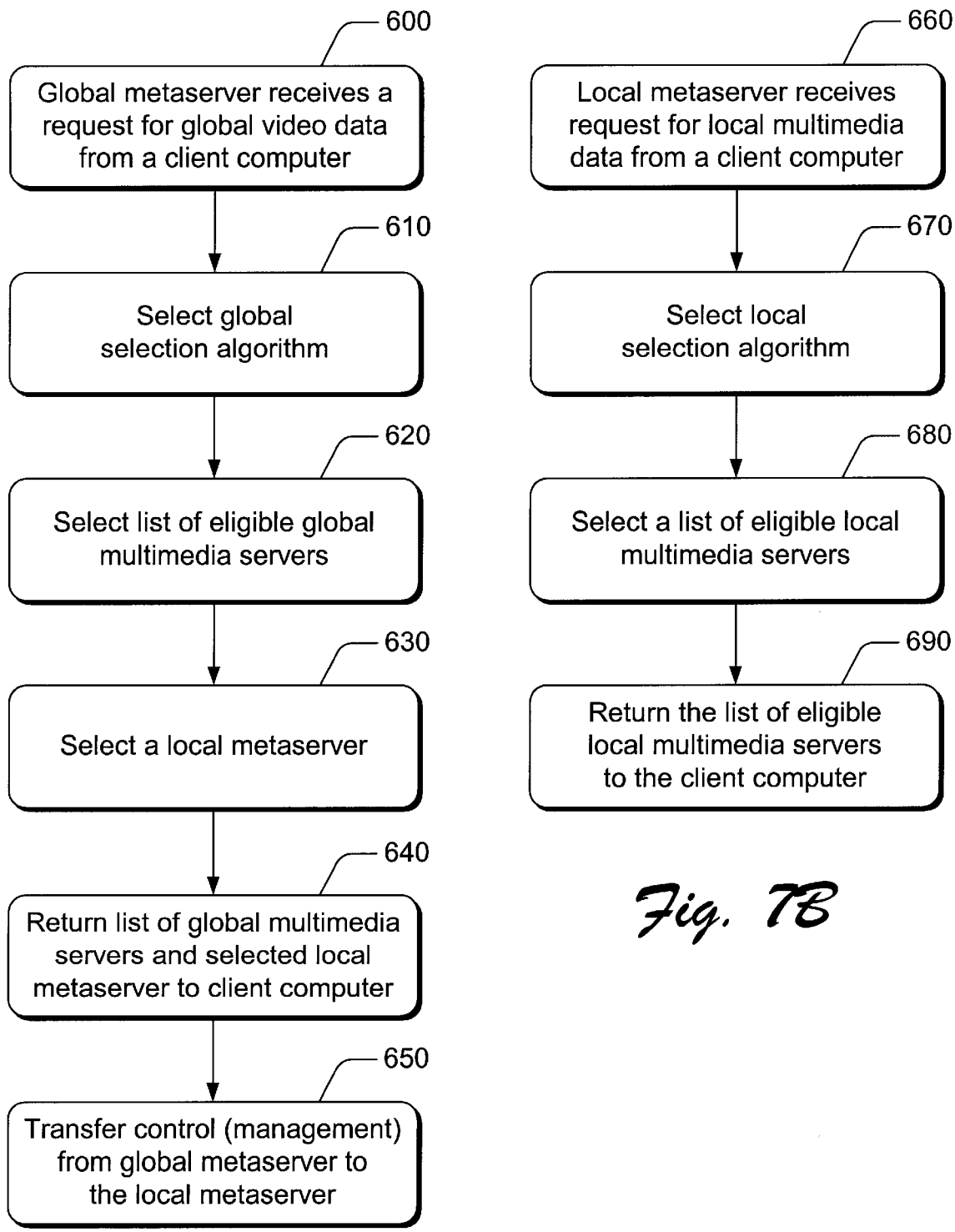

| N | Multimedia Server Names | Multimedia Content | Video Content | Audio Content | Data Content | Live / On_Demand |
|---|---|---|---|---|---|---|
| 1 | $Ax_1$ | $Multimedia\_x_1$ | $Video\_x_1$ | $Audio\_x_1$ | $Data\_x_1$ | $Live\_x_1$ |
| 2 | $Ax_2$ | $Multimedia\_x_2$ | $Video\_x_2$ | $Audio\_x_2$ | $Data\_x_2$ | $On\_Demand\_x_2$ |
| ⋮ | ⋮ | ⋮ | ⋮ | ⋮ | ⋮ | ⋮ |
| i | $Ax_i$ | $Multimedia\_x_i$ | $Video\_x_i$ | $Audio\_x_i$ | $Data\_x_i$ | $Live\_x_i$ |
| N | $Ax_N$ | $Multimedia\_x_N$ | $Video\_x_N$ | $Audio\_x_N$ | $Data\_x_N$ | $Live\_x_N$ |

Fig. 11

METASERVER FOR A MULTIMEDIA DISTRIBUTION NETWORK

BACKGROUND

With the expo of the number of its users the Internet experiences a transition from the period of the development of its infrastructure to the period of wide use of its infrastructure as a communication tool for all computer users.

The conventional Internet applications include the use of electronic mail to connect computer users throughout the world by transferring the textual information, and the use of the world wide web (WWW) servers to transfer the graphical information to a client computer.

In the co-pending U.S. patent application entitled "Dynamic Bandwidth Selection for Efficient Transmission of Multimedia Streams in a Computer Network" disclosed by Hemanth Srinivas Ravi, et al., Vxtreme U.S. application Ser. No. 08/818,127 that is incorporated herein in its entirety, the improved techniques for reliably providing a multimedia stream such as a video and audio stream, together with annotations such as textual and graphical information in an integrated seamless package to a client computer was disclosed.

However, if a large number of client computers would like to get access to a single particular multimedia server having a particular multimedia content, the problem of bottleneck would arise if the single multimedia server does not have enough speed to service all client computers.

Thus, what is needed is the improved technique that would allow (1) elimination of the bottleneck problem, without significantly increasing the cost and speed of a multimedia server with the desirable multimedia content, by introducing the coordination between several multimedia servers; (2) to provide the fault tolerant system; (3) to reduce the network traffic; and (4) to allow seamless integration of the multimedia servers from different organizations.

SUMMARY

The present invention is unique because it provides for a method and an apparatus of using at least one metaserver at the same level of management to introduce the coordination between a plurality of uncoordinated multimedia servers. At least one metaserver is configured to manage the connections between a client computer and a plurality of multimedia servers with the same or different multimedia content in order to eliminate the bottleneck problem, provide the fault tolerance system and reduce the network congestion.

One aspect of the present invention is directed to a method for assigning a plurality of multimedia servers configured to provide data streams for a plurality of client computers. Each client computer is coupled to one or more metaservers at the same level of management and to each multimedia server via a communication network. Each client computer includes a video and audio display device. Each metaserver memory includes a metaserver database that includes information about the video data streams stored in all multimedia servers.

In one embodiment, the system includes one metaserver.

In this embodiment, after receiving a request for a desirable video data stream from one of the client computers, the metaserver selects one of the selection algorithms to minimize the cost of connection between the client computer and the potential multimedia server. Subsequently, the metaserver applies the chosen selection algorithm in order to select a list of eligible multimedia servers from its metaserver database, and communicates the list of eligible multimedia servers to the client computer.

In one embodiment, the chosen selection algorithm includes a set of parameters including a desirable multimedia content, current load, geographic location, and a network distance from the available multimedia server to the client computer.

In one embodiment, the multimedia server can also download an audio stream complementary to the desirable video stream.

In another embodiment, the metaserver can assign to the client computer a multimedia stream with live content or on-demand content. The metaserver can provide the client computer with the status information about the status of the desirable multimedia content, including the waiting time information for the multimedia server having live multimedia content (the time required for the live multimedia transmission) or for the on-demand multimedia server (for example, the time required to change the tape with the requested multimedia content).

Yet, in one more embodiment, the invention discloses a hierarchical metaserver system with two or more levels of management. In one embodiment, a two-level metaserver system includes a higher level metaserver (a Global one) managing a lower level metaserver (a Local one). In this embodiment, the Global metaserver sends the list of available Global multimedia servers having the desirable Global content and the identity of the Local metaserver to the client computer, and the Local metaserver sends to the client computer the list of available Local multimedia servers having a desirable Local content that is matched to the Global content.

Another aspect of the present invention is directed to a method for managing a client computer coupled to a plurality of multimedia servers and coupled to a metaserver. The method includes the following steps: (1) sending a request by a client computer for a desirable multimedia stream to the metaserver; (2) retrieving a list of eligible multimedia servers from the metaserver database; and (3) connecting the client computer to the first available server from the list of eligible multimedia servers.

One more aspect of the present invention is directed to a software apparatus for managing a metaserver with a plurality of multimedia servers and with a plurality of client computers. In one embodiment, the apparatus comprises: (1) a receiver configured to receive the client's request for a desirable multimedia stream; (2) a monitor configured to continuously monitor the status of each multimedia server and the status of the network itself; (3) a selector configured to select at least one eligible multimedia server from the metaserver database using the selection algorithm; and (4) a transmitter configured to transmit the name of at least one eligible multimedia server with the requested multimedia content to the client computer.

Yet, another aspect of the present invention is directed to a computer-readable storage medium useful in association with a metaserver. The computer-readable storage medium includes computer-readable code instructions configured to cause the metaserver to execute the steps of: (1) receiving a request for a video data stream from one of the client computers; (2) monitoring the system; (3) selecting at least one eligible multimedia server from the metaserver database using a selection algorithm; and (4) communicating the name of at least one eligible multimedia server to the client computer.

BRIEF DESCRIPTION OF THE DRAWINGS

FIG. 7A illustrates a flow chart of a method of assigning a plurality of Global multimedia servers for a client computer using a Global metaserver.

FIG. 7B depicts a flow chart of a method of assigning a plurality of Local multimedia servers for a client computer using a Local metaserver.

FIG. 11 shows an exemplary metaserver database table organization.

FULL DESCRIPTION OF THE PREFERRED EMBODIMENT

Figure 1:
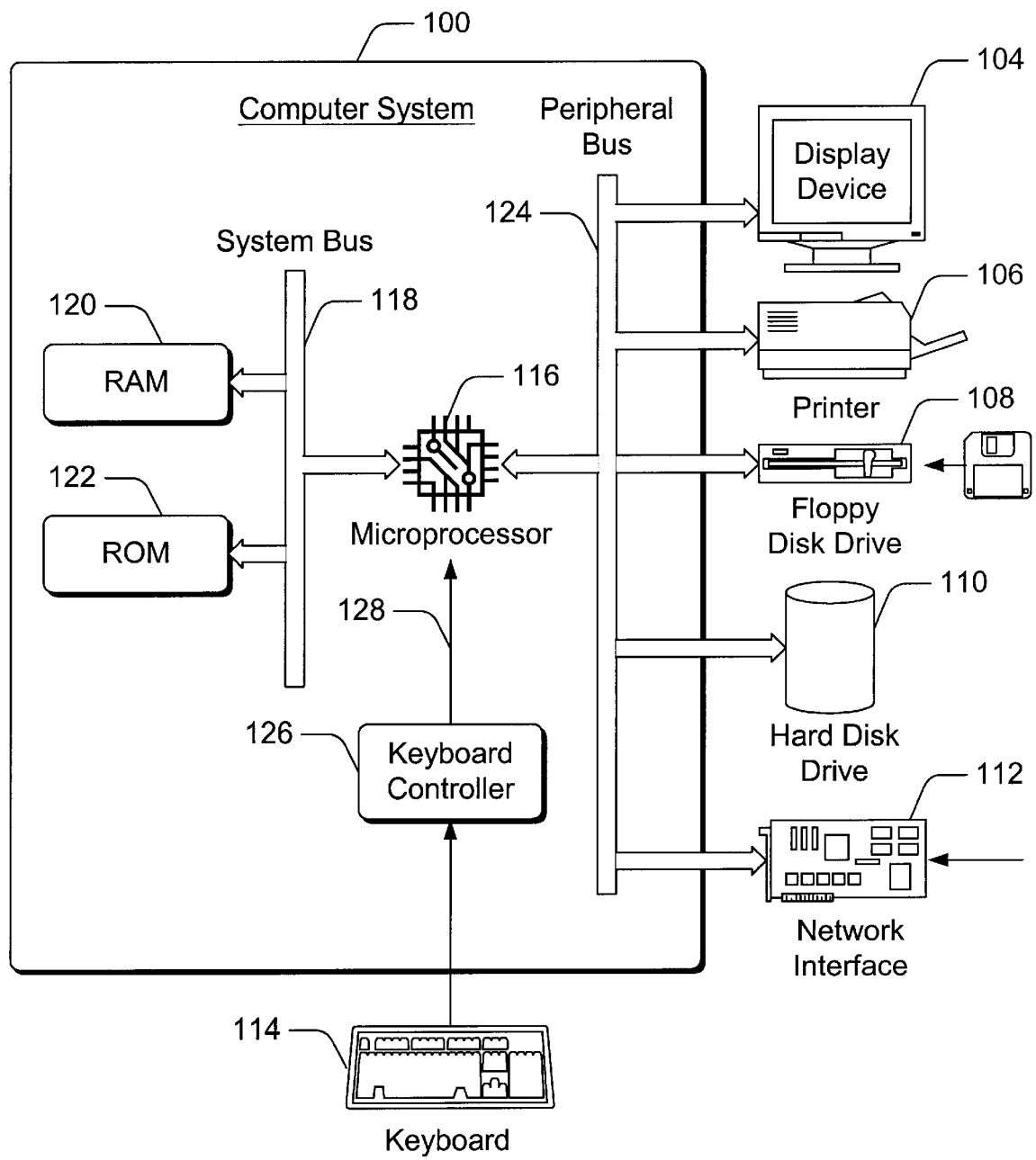
FIG. 1 illustrates a block diagram of an exemplary computer system

Referring to FIG. 1, a computer system 100 gives a schematic description of any of the following devices: a client computer, a multimedia server, or a video producer.

The computer system 100 includes a microprocessor 116 connected via a memory bus 118 to a random access memory (RAM) 120 and to a read-only-memory (ROM) 122. The microprocessor via a keyboard controller (KBC) 126 is connected to a keyboard 114. The computer system 100 also includes a number of peripheral devices like: a display screen 104, a printer 106, a floppy disk drive 108, a hard disk drive 110, and a network interface 112 connected to the microprocessor 116 via a peripheral bus 124.

Microprocessor 116 is a general purpose digital processor that can be implemented using a single-chip processor. Using instructions received from memory (hard drive 110, or floppy disk 108, or ROM 122, or RAM 120), microprocessor 116 manages the input and output data.

Network interface circuit 112 is used to send and receive data over a network connected to other computer systems. An interface card and network software can be used by microprocessor 116 to connect a computer system 100, whether it is a client computer, a multimedia server computer, or a production server computer, to an existing network and transfer data according to standard protocols.

In one embodiment, the network is the Internet. In another embodiment, the network is a corporate intranet.

One of the standard protocols is the TCP/IP protocol. Either the computer network is the Internet or a corporation intranet, the TCP/IP protocol can be used for purposes of connecting the computers of all sizes, from many different computer vendors, running totally different operating systems, to communicate with each other. TCP/IP protocol is normally considered to be a 4-layer system including a link layer, a network layer, a transport layer, and an application layer. For the reference please see "TCP/IP Illustrated, Volume I", by W. Richard Stevens, published in 1994 by Addison Wesley Longman, Inc. This book is incorporated herein by reference.

In one embodiment, the protocol used by the client and the server to communicate over the TCP connection is called HTTP, or the Hypertext Transfer Protocol.

If a client computer is behind a firewall, it can still be connected to stream video from the multimedia server because the HTML protocol can penetrate the firewall.

A client computer, a multimedia server, including a metaserver, and a video producer can be implemented by employing the Web Theater Software kit including the Web Theater Producer, the Web Theater Server, and the Web Theater Client, available from Vxtreme, Sunnyvale, Calif.

The Web Theater Producer enables anyone to capture and compress video streams from a variety of input sources. It includes an authoring tool that allows the integration of video with text, graphics, and other applications. The Web Theater Producer can be realized by using a PC including a Pentium chip and running Windows 95® or Windows NT®.

The Web Theater Server is an advanced software-only streaming server for video, audio, and other synchronized multimedia content. The Web Theater Server has an integrated database interface for efficient management of large libraries of video and multimedia content. Web Theater Server can be realized using a PC including a Pentium chip and running Windows NT.

Web Theater Client can be the plug-in to Netscape navigator or the Microsoft Internet Explorer browser. It has a low CPU overhead and includes complete VCR-like controls, allowing the user to efficiently fast forward, stop, skip, pause, or jump backwards in the video. The Web Theater Client can be realized using a PC including a Pentium chip and running Windows 95 or Windows NT.

Figure 2:
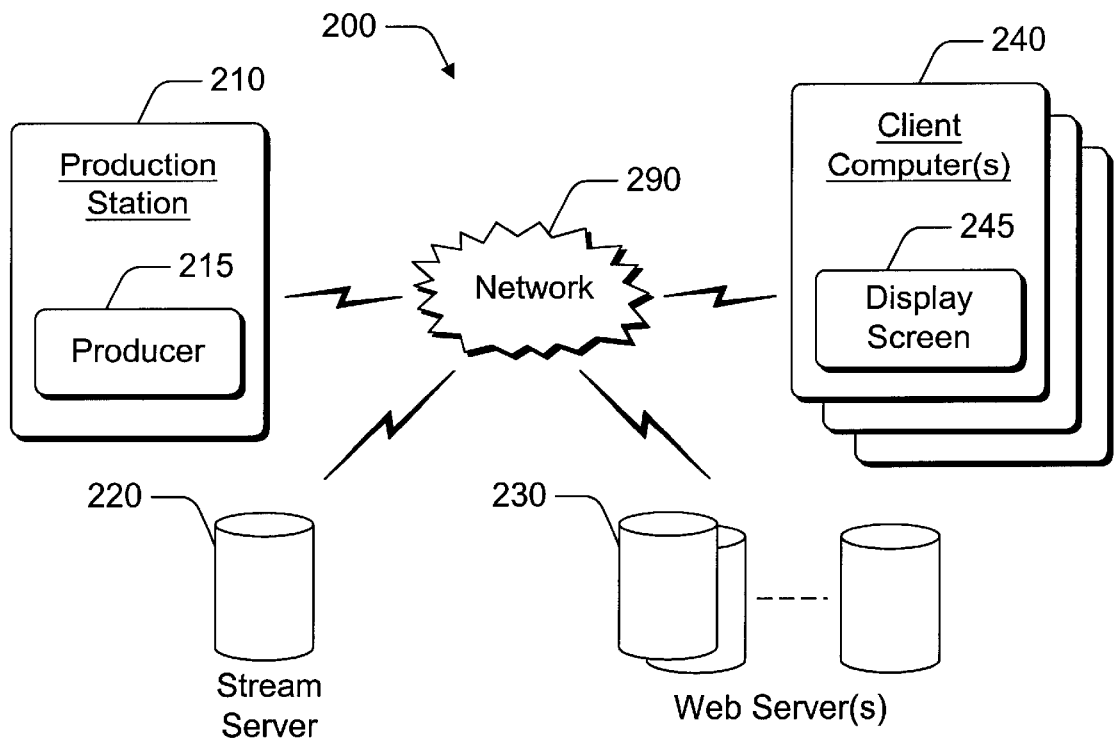
FIG. 2 depicts a block diagram of an exemplary hardware environment for the video-on-demand system.

Referring to FIG. 2, the computer system 200 illustrates how the annotated video-on-demand and/or real-time video system can be realized. The computer system 200 includes a production station 210, a stream server 220, one or more web servers 230, and one or more client computers 240 connected via a network 290. The production station 210 includes a producer 215, and the client computer(s) 240 include a display screen 245. For a complete description of this system, please see U.S. patent application Ser. No. 08/818,127 entitled "Dynamic Bandwidth Selection for Efficient Transmission of Multimedia Streams in a Computer Network", which is incorporated herein in its entirety. U.S. patent application Ser. No. 08/818,127 issued as U.S. Pat. No. 6,292,834 to Ravi et al. on Sep. 18, 2001.

The computer system of FIG. 2 employs a video stream delivery of video to a client computer.

Streaming video delivery is a very efficient method of transmitting large video data streams over a network. Traditional methods of video delivery require that the entire video stream be transmitted before the user can begin viewing. In contrast, streaming, or "real-time" delivery allows the user to begin viewing the video immediately, while the stream of video data is still being transmitted. Because streaming delivery is based on a just-in-time model, it lets users skip from one spot in a video to another, or jump to a different video, without waiting for downloads to complete.

However, the delivery of streaming audio-video over the standard TCP/IP Internet infrastructure faces a lot of problems.

The most difficult problem facing any video provider over the Internet is the requirement of high bandwidth for video transmission. For example, the raw data for a one hour movie shown at 640×480 resolution at 30 fps (frames per second) is about 100 Gbytes. Transmitting this uncompressed video over a 10 Mbps (Megabytes per second) Ethernet link would take about 22 hours, and transmitting this uncompressed video over a 28.8 Kbps modem would take about 320 days. Thus, for a real time video transmission, video should be heavily compressed.

Vxtreme developed the scalable software-only video compression (the compression ratio is up to 500:1) by employing a compression/decompression algorithm (codec).

The Vxtreme codec algorithm is capable of bandwidth scalability, that is the codec algorithm is able to deliver compressed video streams over a wide range of bandwidths from 20 Kbps for POTS to several Mbps for switched LAN environments. In one embodiment, the codec algorithm includes a Vxtreme scalable vector quantization (SVQ) compression algorithm.

The scalability can be achieved because the Vxtreme codec has low computational requirements for encode and decode operations. Therefore, a client computer can have a very minimal CPU resource in order to decode compressed video.

The codec algorithm employs a layered embedded encoding. Therefore, the codec is able to produce a prioritized stream consisting of multiple layers, allowing a client computer to receive only a subset of the layers in order to limit the bandwidth consumed.

Referring again to FIG. 2, the video stream can be compressed using a compression format based on a standard H263, generating, for example, a QCIF resolution (176× 144) video frames at 10–20 fps that can be encoded and transmitted over a 20 Kbps connection. On the other hand, the video stream used in the apparatus of FIG. 2 can be compressed using the Vxtreme scalable vector quantization (SVQ) compression algorithm that allows one to dynamically transmit data at rates from 10 Kbps to several Mbps and to support the scalable resolution of 160×120 to 640× 480 and frames ranging from 1 fps to 30 fps.

Figure 3:
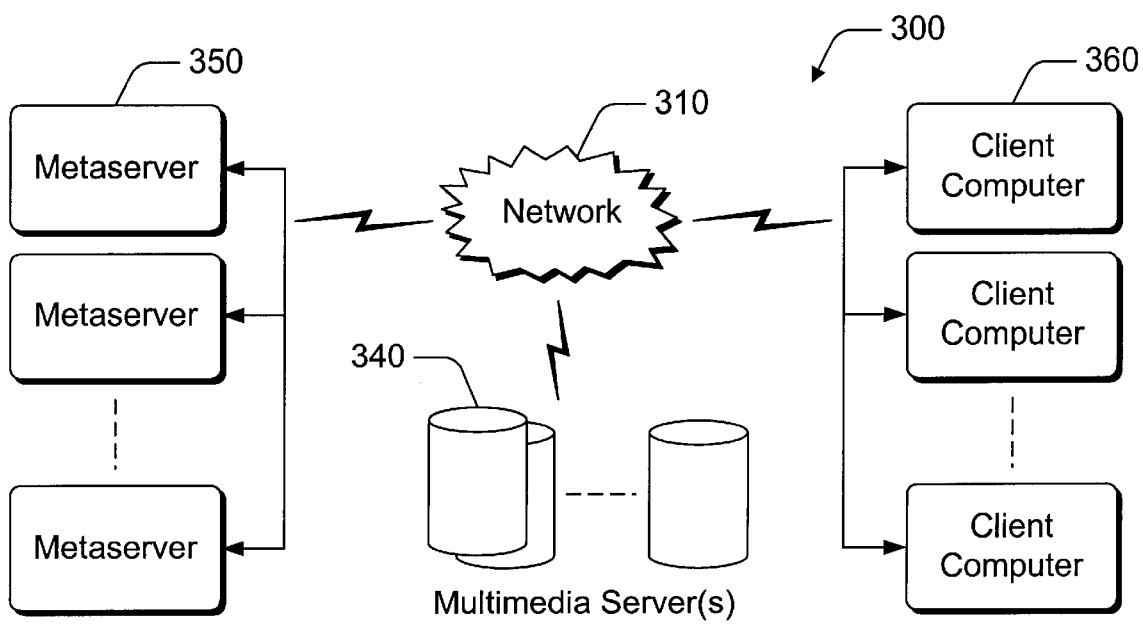
FIG. 3 shows a block diagram of a hardware environment for practicing the present invention including a metaserver.

FIG. 3 is a block diagram showing an exemplary hardware environment for practicing the present invention. The hardware environment of FIG. 3 includes a computer system 300 including a plurality of client computers 360, a plurality of multimedia servers 340, and a plurality of metaservers 350, connected by a computer network 310.

Figure 9:
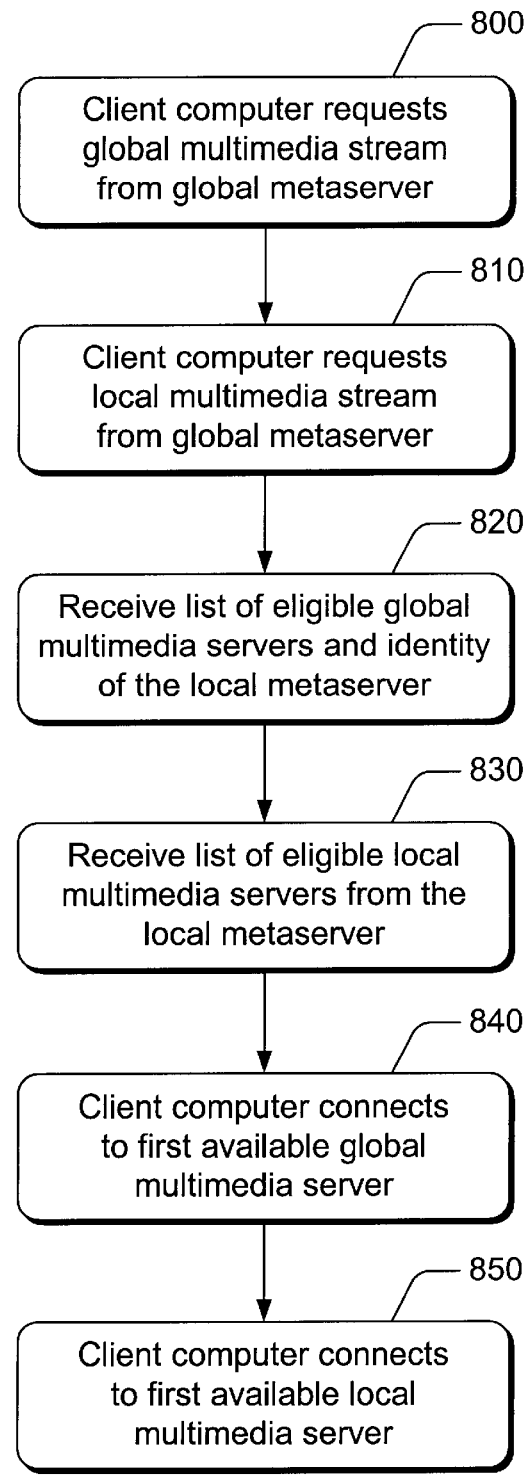
FIG. 9 depicts a flow chart of a method of receiving by a client computer a list of eligible Global multimedia servers from a Global metaserver and receiving a list of eligible Local multimedia servers from a Local metaserver.

The metaserver 350 of FIG. 3 includes a metaserver database 940 which is shown as a component of the metaserver architecture in FIG. 9.

Any database system is a computer-based record keeping system: that is, a system whose overall purpose is to record and maintain information. Thus, a database is a repository for stored data. In general, it is both integrated and shared. By "integrated" we mean that the database may be thought of as a unification of several otherwise distinct data streams, with any redundancy among those streams partially or wholly eliminated. By "shared" we mean that individual pieces of data in the database may be shared among several different users, in the sense that each of those users may have access to the same piece of data. The shared database can be also a concurrently shared database: that is, it can be shared by multiple users at the same time.

The hardware component of the database consists of the memory storage devices like a hard drive, a CD ROM, etc. The software component of the database provides the interface between the storage of data and a client computer. It is called the database management system (DBMS).

Referring back to FIG. 1, the metaserver 350 of FIG. 3 includes a processor and a memory. The metaserver memory can be configured to store a metaserver database which includes information about the video data streams stored in each multimedia server (340). According to the present invention, the metaserver database can be concurrently shared by all client computers. The metaserver database can be implemented using the Oracle 8.0 DBMS manufactured by Oracle Corporation, Redwood City, Calif., that is capable of high-end functionality, scalability, and object-oriented capability. The Oracle 8.0 can support tens of thousands of concurrent client computers.

The basic idea of the present invention is to use at least one metaserver at the same level of management to store in the metaserver database all information about the multimedia content of all multimedia servers, to use this information in order to coordinate the uncoordinated plurality of multimedia servers, and to manage the connection between a client computer and a multimedia server having the requested multimedia content.

Indeed, assume that a client computer B desires to receive a particular multimedia stream Multimedia_X. The client computer goes to at least one metaserver and asks which multimedia servers are available for connection. The metaserver looks into its database. In one embodiment, FIG. 11 shows an exemplary metaserver's relational database table 1000 that has three domains: i. d. numbers 1010, multimedia server names 1020 and Multimedia content 1025 that includes {Video content 1030, Audio content 1040, data content 1050, and multimedia server's status 1060: Live or On_Demand}. Thus, database 1000 is a three-tuple (3-ary) database. The database 1000 can be ordered or unordered. To add ordering, at least one metaserver can use one of the selection algorithms described below.

In one embodiment, the system includes a single metaserver. In this embodiment, looking into its database 1000 of FIG. 11, the metaserver supplies the client computer B with a list of possible multimedia servers $A_X$ each of which has this particular multimedia stream Multimedia_X. Afterwards, the client computer B connects with the multimedia server including the particular multimedia content Multimedia_X that has the lowest connection cost. See discussion below.

It follows, that the metaserver allows one to manage the connection between a client computer and an available multimedia server in such a fashion as to avoid the bottleneck problem that can arise because a lot of client computers would try to connect with a particular multimedia server to obtain the same desirable multimedia content. The metaserver avoids the bottleneck problem by sending different clients to different multimedia servers.

Figure 5:
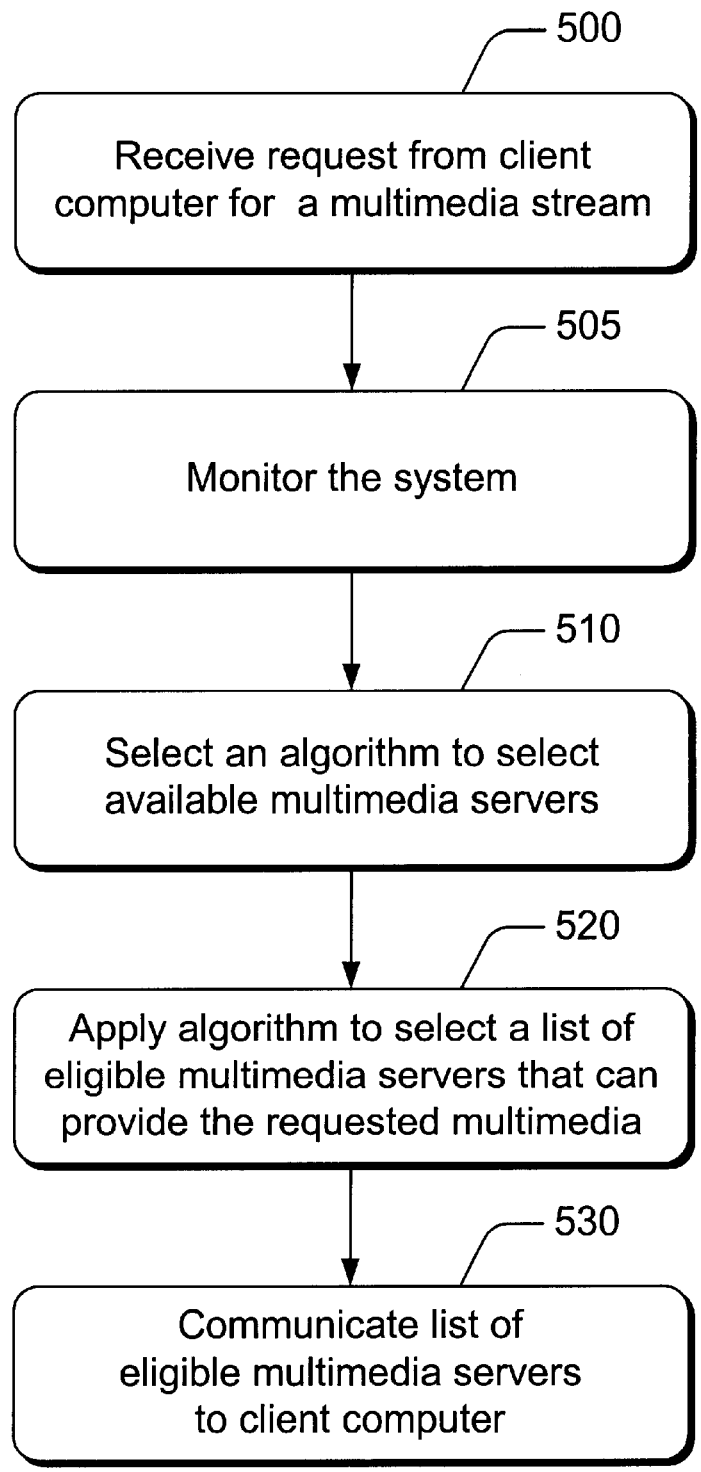
FIG. 5 depicts a flow chart of a method of assigning a plurality of multimedia servers for a client computer using a metaserver.

The flow charts of FIGS. 5, 6, and 7A describe the present invention from the single metaserver's point of view.

Referring to a flow chart of FIG. 5, in step 500 the metaserver 350 of FIG. 3 receives a request from one of client computers B for a multimedia stream Multimedia_X. The metaserver continuously monitors the system including each multimedia server and the network itself in order to update its database and to relate each multimedia server with the particular multimedia content (step 505). See discussion above.

In step 510 the metaserver selects the algorithm that it uses to select the list of multimedia servers that are available for connection with the client computer B.

The selection of the proper algorithm allows the metaserver to balance the load (a particular multimedia content) across all available multimedia servers by dynamically assigning clients to different multimedia servers each time a client requests a particular multimedia content. If some multimedia servers are busy, then clients will be sent to a multimedia server that can service new clients. The total capacity of the system is the sum of capacities of all multimedia servers in the system.

The metaserver also tries to improve overall system efficiency by matching clients with nearby servers. For example, an intranet may have corporate servers in London and Los Angeles. Clients in San Francisco will probably receive better service (lower latency, fewer lost packets) if they connect to a Los Angeles server.

To distribute the work, the metaserver should have a measure of how busy each multimedia server is, and how close a particular client is to each multimedia server with the proper content. To measure how busy a server is, the metaserver periodically communicates with each multimedia server to receive from each multimedia server its status information such as: number of current connections and multimedia content. To measure how close a client is to a multimedia server, the metaserver currently uses time zone, sub net addresses, and optional region names that may be assigned by a system administrator. Eventually, the metaserver will use more detailed network topology information.

The metaserver combines a number of values into a single value which represents the cost to the system for a particular server to provide data to a particular client. This allows the metaserver to sort the servers by cost, and then simply match the clients to the cheapest server, then to the next cheapest, and so on. The whole procedure should be recomputed each time a client tries to connect to a server.

The cost of connection between a client and a multimedia server is a function of a list of parameters [$\alpha 1, \alpha 2, \alpha 3, \alpha 4, \alpha 5, \alpha 6, \alpha 7, \ldots$].

In one embodiment, the list of parameters includes the following 7 parameters:

$\alpha 1 = $ {Whether the multimedia server is currently running and has not exceeded its maximum licensed connections};

$\alpha 2 = $ {Whether the client and a multimedia server are separated by a firewall};

$\alpha 3 = $ {Whether the client and a multimedia server are in the same time zone};

$\alpha 4 = $ {Whether the client and a multimedia server are in the same region (defined by a system administrator)};

$\alpha 5 = $ {Whether the client and a multimedia server are on the same subnet};

$\alpha 6 = $ {The load per processor on the multimedia server}; and $\alpha 7 = $ {The number of streams per processor being currently served by the multimedia server}.

Referring again to the flow chart of FIG. 5, in step 520 the metaserver 350 of FIG. 3 applies the chosen algorithm with the list of parameters [$\alpha 1, \ldots \alpha 7$] to select a plurality of the low cost eligible multimedia servers $A_X$ that can provide the client computer B with the particular multimedia content Multimedia_X.

In one embodiment, each above-mentioned parameter ($\alpha i$) is assigned a weight ($W i$), and the minimum cost of connection is determined by the minimization of the following function:

$$F = \sum_{i=1}^{i=7} (\alpha i) \times (W i).$$

In another embodiment, the metaserver sets some weights to zero. This operation effectively removes parameters with zero weights from the selection algorithm.

In all cases, the metaserver can use the selection algorithm to produce an ordered list of multimedia servers, wherein a multimedia server with a lower cost of connection to the particular client computer precedes (occupies a higher place in this list) a multimedia server with a higher cost of connection.

In one embodiment, wherein the metaserver cannot find a particular multimedia server with particular multimedia content using its own database, the metaserver selects another metaserver at the same level of management and communicates with the selected metaserver in order to obtain the identity of the particular multimedia server from the selected metaserver.

In step 520 the metaserver applies the selection algorithm to obtain an ordered list of eligible multimedia servers with the requested multimedia content.

Finally, in step 530 the metaserver communicates the list of eligible servers to the client computer B.

Thus, the metaserver can coordinate a plurality of multimedia servers, located in different geographical areas, in such a way as to increase proximity (or reduce the cost of connection) between a client computer and a multimedia server with the requested content that is located in the geographical area nearest to the client computer.

In one embodiment, to increase the fault tolerance one can back up the main metaserver with a substitute metaserver in tandem, so that if the main metaserver faults, the substitute one takes over.

In another embodiment, the present invention can include several metaservers at the same level of management to spread the work among the metaservers.

To reduce interaction between servers, a video stream Video_X, an audio stream Audio-X and a data stream Data_X (complementary to the video data stream Video_X) are stored entirely in a single server. The audio stream Audio_X includes Audio time stamps, and the data stream Data_X includes Data time stamps matched with the video stream time stamps Video_time_X stamp, so the client is capable of synchronizing the files. Hence, the servers do not have to cooperate once a client computer has been assigned to a single multimedia server.

Thus, the multimedia servers have little or no interaction with each other. Therefore, there is little performance penalty to having a large system of the multimedia servers and the system performance scales linearly with the number of multimedia servers.

The metaserver database can lack multimedia servers with some particular multimedia content. In one embodiment, the multimedia servers with a particular multimedia content can be dynamically added to the system using a video source server. The video source server can be implemented using the computer system of FIG. 1 that additionally includes a video camera capable of making a live video, or a VCR providing the video tape of the pre-recorded video. The video source server can be also implemented using the Web Theater Producer as discussed above.

Figures 6A, 6B:
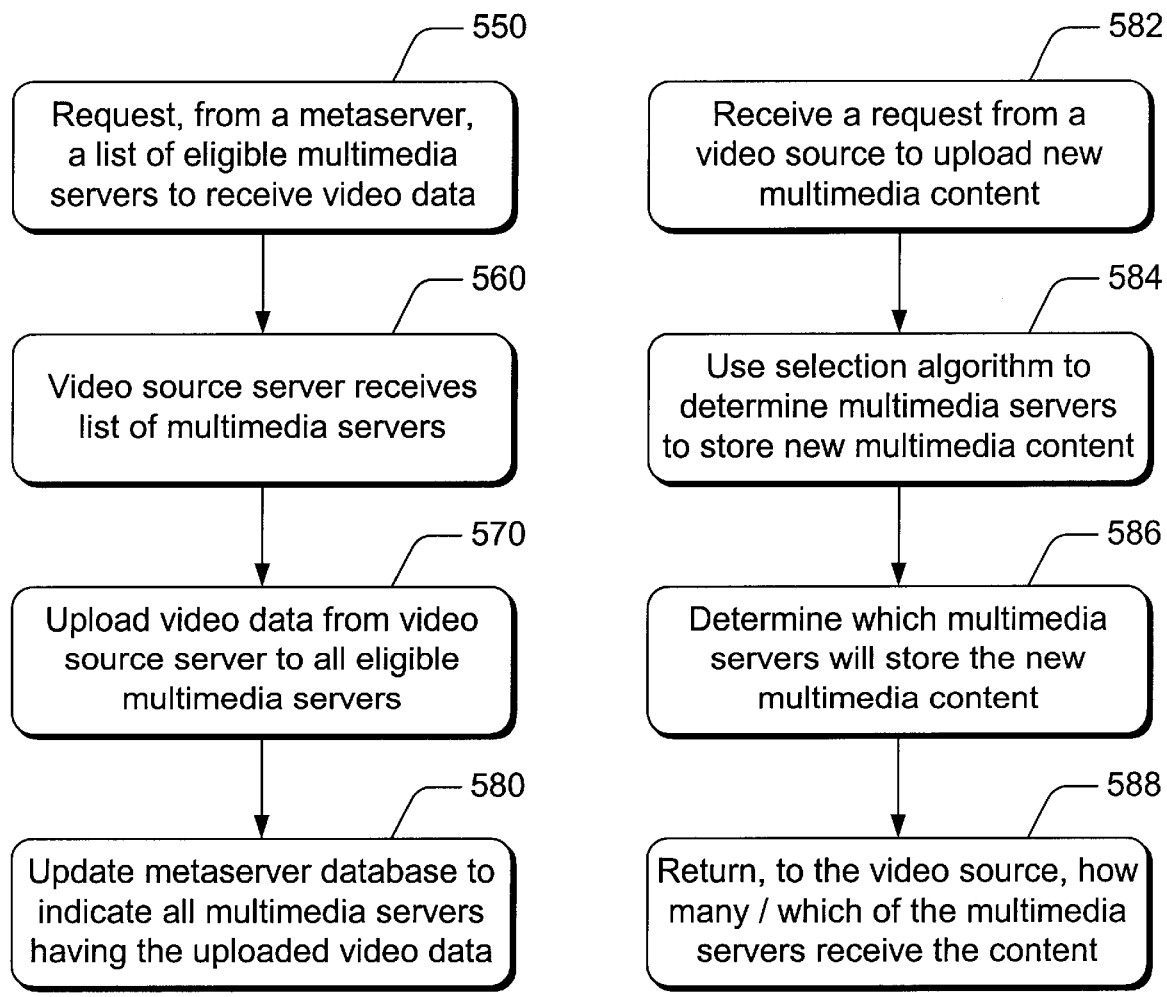
FIG. 6A shows a flow chart of a method of uploading the multimedia content to a plurality of multimedia servers from the video source perspective.
FIG. 6B illustrates from the metaserver perspective the process of uploading the new multimedia content.

In one embodiment, shown in FIG. 6A, the video source server (step 550) inquires the metaserver about a list of multimedia servers $A_Y$ eligible for installation of a new video data stream Video_Y. In step 560, the video source server retrieves the list of multimedia servers $A_Y$ eligible for installation of the new video data stream Video_Y from the metaserver database. In the next step (570), the video source server uploads the new video data stream Video_Y to each multimedia server $A_Y$ eligible for installation. In the final step 580, the video source server updates the metaserver database to include each $A_Y$ multimedia server having a new video data stream Video_Y.

Referring to FIG. 6B, from the metaserver perspective the same process of uploading the new multimedia content includes the following steps: (582) receive request from a video source to upload new multimedia content; (584) using the selection algorithm, determine how many multimedia servers would store the new content; (586) determine which multimedia servers would store the new content; and (588) return the description {how many, which} of multimedia servers to the video source.

The metaserver can add the new multimedia servers to its database using the process of FIG. 6B to increase the capacity of the overall system. The metaserver can also remove any multimedia server from its database at any time to support the system maintenance.

The metaserver can manage both live and on-demand video streams. If a client computer wishes to watch a live event or an on-demand content, it should be prepared to wait until the event actually starts or until the tape with the requested multimedia content is installed into the multimedia server.

Figure 4:
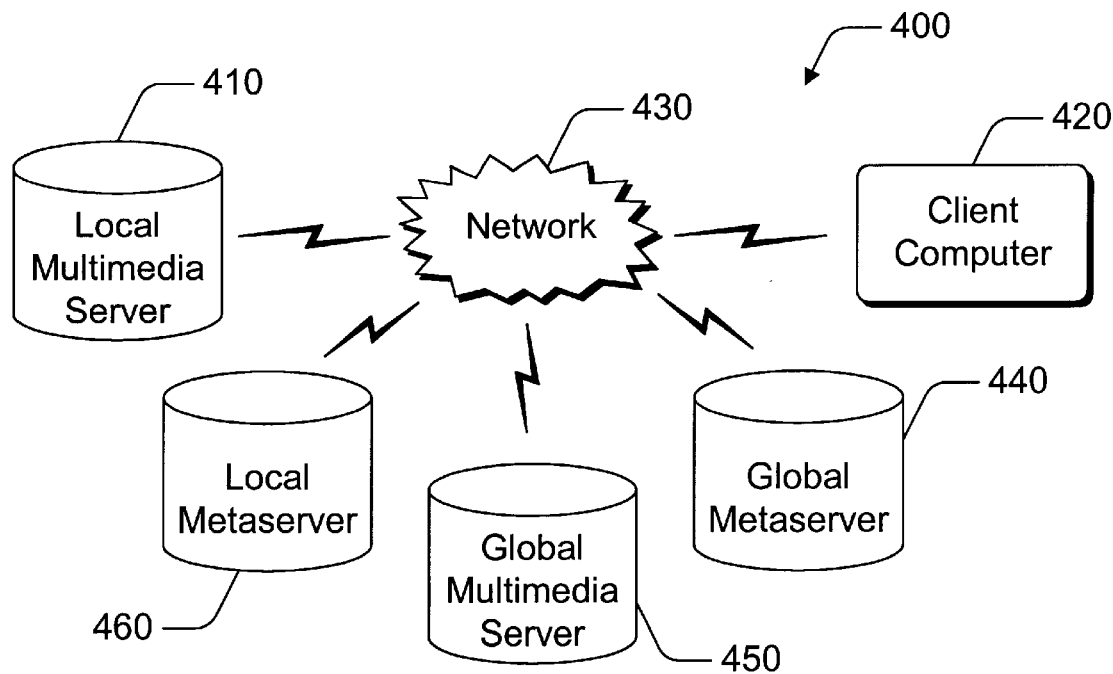
FIG. 4 is an illustration of a hardware environment of another embodiment of the present invention including a Global metaserver and a Local metaserver.

In one more embodiment, the invention discloses a hierarchical metaserver system 400 with two or more levels of management, as shown in FIG. 4.

In one embodiment, a two-level metaserver system includes a higher level metaserver 440 (a Global one) managing a lower level metaserver 460 (a Local one).

In this embodiment, the Global metaserver 440 is responsible for a Global Multimedia_X content available from a Global multimedia server 450, and the Local metaserver 460 is responsible for a Local Multimedia_X content available from a Local multimedia server 410. In another embodiment, the Global metaserver (for example, T. V. station in New York) manages the Global video streams, wherein the Local metaserver (for instance, the local T. V. station in the Middle East) provides the Local audio streams and the annotation content (like translation or local comments) to a client computer 420 via a network 430.

The flow chart of FIG. 7A illustrates this concept in more detail from the Global metaserver point of view. In step 600, the Global metaserver receives a request for a Global video data stream Global_Multimedia_X from one of the client computers B. The Global metaserver selects a Global selection algorithm from a menu of Global algorithms (step 610). See discussion above. In the next step 620, the Global metaserver selects a list of eligible Global multimedia servers Global_$A_X$ from the Global metaserver database using the Global selection algorithm, selects the Local metaserver (630), and communicates the list of eligible Global multimedia servers Global_$A_X$ and the identity of a Local metaserver (step 640) to the client computer B. In the next step 650, the Global metaserver transfers management responsibility to the Local metaserver.

As shown in FIG. 7B, the Local metaserver acts substantially in the same way regarding the Local video streams (including also audio streams and annotation contents) as the Global metaserver acts regarding the Global video streams.

In step 660, the Local metaserver receives a request for a Local video data stream Local_Multimedia_X from the client computer B. After selecting a Local selection algorithm from a menu of Local algorithms (step 670), the Local metaserver applies the chosen Local selection algorithm in order to select a list of eligible Local multimedia servers Local_$A_X$ from the Local metaserver database (step 680). Finally, the Local metaserver communicates the list of eligible Local multimedia servers Local_$A_X$ to the client computer B (step 690). To achieve the seamless Global and Local video streaming, each Local_Multimedia_X stream includes the Local time stamps that are matched with the Global time stamps of the Global_Multimedia_X stream.

Figure 8:
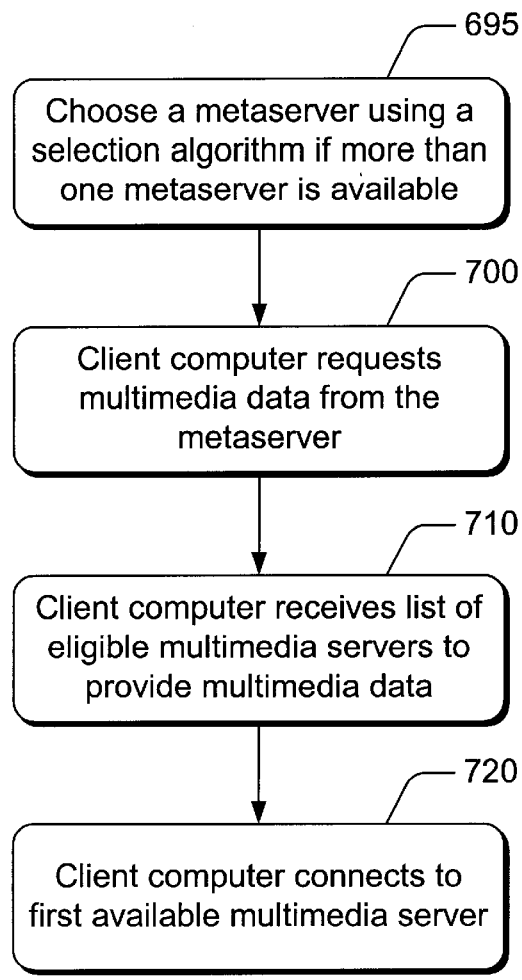
FIG. 8 shows a flow chart of a method of receiving a list of eligible multimedia servers by a client computer from a metaserver.

The flow charts of FIGS. 8 and 9 describe the present invention from the client computer's point of view. FIG. 8 illustrates one embodiment of the present invention wherein there is only one metaserver. On the other hand, FIG. 9 depicts another embodiment of the present invention, wherein the metaserver includes a Global metaserver coupled to a Local metaserver. See discussion of flow chart of FIG. 7 above.

According to FIG. 8, if more than one metaserver is available at the same level of management, the client picks one metaserver (step 695). Next (step 700), the client computer B sends a request for a multimedia data stream Multimedia_X to the metaserver. Secondly, (step 710) the client computer B retrieves from the metaserver a list of eligible multimedia servers, wherein each eligible multimedia server $A_X$ includes the multimedia data stream Multimedia_X. Finally (step 720), the client computer B connects to the first available server $A_X$ from the list of eligible multimedia server names $A_X$ via the network in order to display the multimedia stream Multimedia_X on its video and audio display device.

In one embodiment, the client computer sends a request for a Video_X stream to one multimedia server, and sends a request for a complementary Audio_X stream to another multimedia server.

At first (step 800), the client computer B sends a request to the Global metaserver for a Global multimedia stream Global_Multimedia_X. The client computer also sends a request to the Global metaserver for a Local multimedia stream Local_Multimedia_X (step 810).

The client computer retrieves a list of eligible Global multimedia servers Global_$A_X$ from the Global metaserver database (step 820). The Global metaserver also returns the identity of the Local metaserver to the client computer (see discussion above of the flow chart of FIG. 7) to allow the client computer to retrieve a list of eligible Local multimedia servers Local_$A_X$ from the Local metaserver database (step 830).

Finally, the client computer B connects (step 840) to the first available Global server Global_$A_{X1}$ from the list of eligible Global multimedia servers, and connects (step 850) to the first available Local server Local $A_{X1}$ from the list of eligible Local multimedia server names Local_$A_X$ in order to display the Global multimedia content Global_Multimedia_X and the Local multimedia content Local_Multimedia_X on its video and audio display device. Each Local_Multimedia_X stream includes the Local time stamps that are matched with the Global time stamps of the Global_Multimedia_X stream to achieve the seamless Global and Local video streaming.

The present invention can be also described in terms of a software machine, that is a general purpose computer executing the specific instructions.

Figure 10:
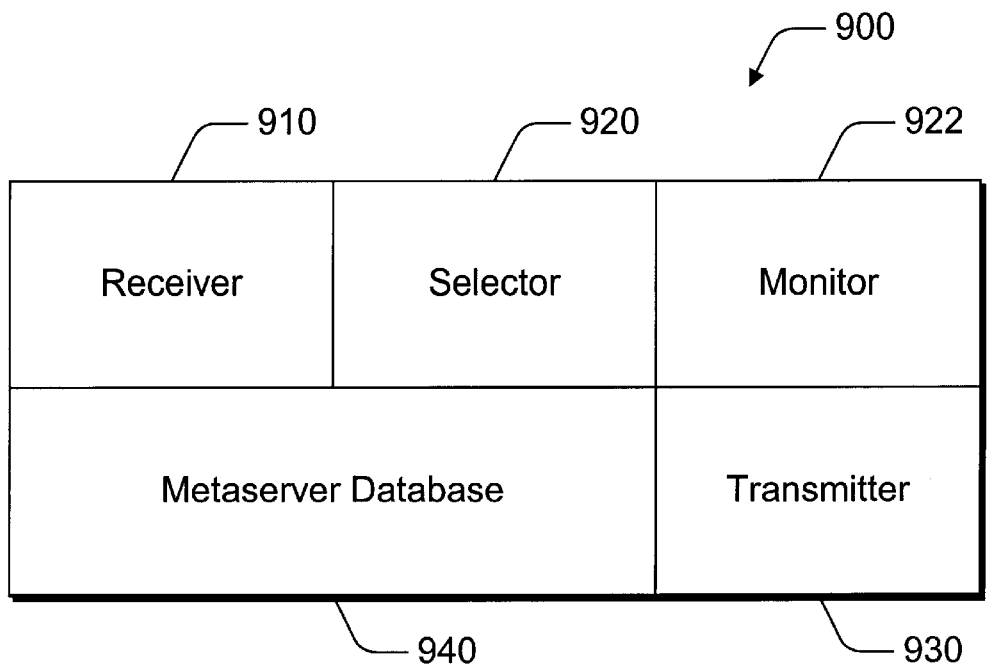
FIG. 10 illustrates the metaserver architecture.

In one embodiment, from the metaserver point of view, as shown in FIG. 10, the software machine (900) of the present invention includes: (1) a receiver 910 configured to receive a request for a video data stream from one of the client computers; (2) a monitor 922 configured to continuously monitor the status of each multimedia server and the status of the network itself; (3) a selector 920 configured to select at least one eligible multimedia server from the metaserver database using a selection algorithm; and (4) a transmitter 930 configured to transmit the name of at least one eligible multimedia server to the client computer.

In another embodiment, from a client computer point of view (not shown), the software machine of the present invention includes: (1) a transmitter configured to transmit a request for a multimedia stream to the metaserver; (2) a receiver configured to receive the name of at least one eligible multimedia server retrieved from the metaserver database; (3) a selector configured to select the name of at least one multimedia server having the requested multimedia stream; and (4) a display device configured to display the requested multimedia stream.

The present invention can also be embodied as computer-readable code on a computer-readable medium. The computer-readable medium is any data storage system (like CD-ROM, optical data storage device, etc.) capable of storing computer-readable data. The computer-readable medium can also be stored and distributed over network-coupled computer systems. In the distributed embodiment, the distributed computer-readable data is stored and executed.

In one embodiment, a computer-readable storage medium useful in association with a metaserver includes computer-readable code instructions configured to cause the metaserver to execute the following steps: (1) receive a request for a multimedia stream from one of the client computers; (2) continuously monitor the status of each multimedia server and the status of the network itself; (3) select at least one eligible multimedia server from the metaserver database using a selection algorithm; and (4) communicate the name of at least one eligible multimedia server to the client computer.

In another embodiment, a computer-readable storage medium useful in association with a client computer includes computer-readable code instructions configured to cause the client computer to execute the following steps: (1) send a request for a multimedia stream to the metaserver by one of the client computers; (2) retrieve the name of at least one eligible multimedia server by the client computer from the metaserver database; and (3) connect the client computer to at least one eligible multimedia server via the network in order to display the requested multimedia stream on the client computer video and audio display device.

The description of the preferred embodiment of this invention is given for the purposes of explaining the principles thereof, and is not to be considered as limiting or restricting the invention since many modifications may be made by the exercise of skill in the art without departing from the scope of the invention.

What is claimed is:

1. In at least one metaserver at one level of management, each said metaserver having a processor and a memory, a method for assigning a plurality of multimedia servers configured to provide data streams for a plurality of client computers, each said client computer being coupled to each said metaserver at the same level of management and to each said multimedia server via a network, each said client computer including a video and audio display device, each said metaserver memory configured to store a metaserver database that includes information about the data streams stored in at least one of said multimedia servers, said method comprising:

receiving a request for a multimedia stream from one of said client computers;

monitoring the status of each said multimedia server and the status of said network;

selecting from the metaserver database at least one eligible multimedia server storing the requested multimedia stream using a selection algorithm; and communicating a name of said at least one eligible multimedia server to said client computer.

2. The method of claim 1, wherein selecting further includes:

using a minimum cost algorithm as said selection algorithm;

choosing a set of parameters including multimedia content, current load, geographic location, and a network distance from said at least one multimedia server to said client computer; and applying said minimum cost algorithm to said set of parameters.

3. The method of claim 2, wherein applying said minimum cost algorithm to said set of parameters further includes communicating with said at least one multimedia server periodically to find for said at least one multimedia server its current load and a Multimedia content status.

4. The method of claim 1, further comprising providing said at least one multimedia server with an audio stream (Audio_X) including audio time stamps (Audio_time_stamp_X), wherein said at least one multimedia server $A_X$ has a video data stream (Video_X) including video time stamps (Video_time_stamp_X), and wherein said audio (Audio_X) is complementary to said video data stream (Video_X), and wherein said video time stamps (Video_time_stamp_X) are matched with said audio time stamps (Audio_time_stamp_X).

5. The method of claim 1, further comprising:

inquiring by a video source server from said metaserver at least one multimedia server ($A_Y$) eligible for installation of a new video data stream (Video_Y);

retrieving the name of said at least one ($A_Y$) multimedia server eligible for installation the new video data stream (Video_Y) from said metaserver database by said video source server;

uploading from said video source server the new video data stream (Video_Y) to said at least one eligible for installation multimedia server ($A_Y$); and updating said metaserver database to include said at least one multimedia server ($A_Y$), wherein said at least one multimedia server ($A_Y$) includes the new video data stream (Video_Y).

6. The method of claim 1, further comprising uploading by creating at least one new multimedia server ($A'_X$) having the multimedia stream (Multimedia_X).

7. The method of claim 6, wherein uploading further includes:

connecting a video source server to at least one said metaserver at the same level of management to obtain from said at least one metaserver database at least one multimedia server ($A'_X$) eligible for installation said multimedia stream (Multimedia_X);

retrieving the name of said at least one multimedia server ($A'_X$) eligible for installation of said multimedia stream (Multimedia_X) from said at least one metaserver database by said video source server;

uploading from said video source server said multimedia stream (Multimedia_X) to each said multimedia server ($A'_X$) eligible for installation; and updating at least one said metaserver database to include said at least one ($A'_x$) multimedia server, wherein said at least one ($A'_x$) multimedia server includes the multimedia stream (Multimedia_X).

8. The method of claim 1, further including adding a new multimedia server to said at least one multimedia server in said metaserver database to increase the capacity of said metaserver.

9. The method of claim 1, further including removing a multimedia server from said at least one multimedia server in said metaserver database to support said removed server maintenance.

10. The method of claim 1, further including using an intranet corporate network as said network, wherein said at least one multimedia server is located within one branch office.

11. The method of claim 1, further including using the Internet network as s aid network.

12. The method of claim 1, further including:
assigning a multimedia stream with live content (LIVE_ X) to at least one multimedia server ($A_{LIVE\_x}$) by said metaserver;
assigning a multimedia stream with on-demand content (ON_DEMAND_X) to at least one multimedia server ($A_x$) by said metaserver; and
providing status information about the status of (LIVE_ X) or (ON_DEMAND_X) multimedia content (Multimedia_X) for each said live or on-demand multimedia server into said metaserver database, wherein said status information includes waiting time information (WAITING_TIME_LIVE_X) for each said multimedia server ($A_{LIVE\_x}$) having (LIVE_X) multimedia content.

13. The method of claim 1, where in said at least one metaserver is a Global metaserver, and wherein said Global metaserver is coupled to a Local metaserver, and wherein said Global metaserver and said Local metaserver are at the different levels of management, and wherein said Global metaserver includes a Global metaserver database, said method further comprising:
receiving a request for a Global multimedia stream from one of said client computers, wherein said Global multimedia stream includes Global video time stamps;
monitoring the status of each said multimedia server and the status of said network;
selecting a Global selection algorithm from a menu of Global algorithms;
selecting at least one eligible Global multimedia server from said Global metaserver database using said Global selection algorithm;
communicating the name of said at least one eligible Global multimedia server and the identity of said Local metaserver to said client computer; and
transferring management responsibility from said Global metaserver to said Local metaserver to separate Global and Local multimedia streams being retrieved by said client computer.

14. The method of claim 1, wherein said at least one metaserver is a Global metaserver, and wherein said Global metaserver is coupled to a Local metaserver, and wherein said Global metaserver and said Local metaserver are at the different levels of management, and wherein said Global metaserver includes a Global metaserver database and wherein said Local metaserver includes a Local metaserver database, said method further comprising:
receiving a request for a Global multimedia stream from one of said client computers, wherein said Global multimedia stream includes Global video time stamps;
monitoring the status of each said multimedia server and the status of said network;
selecting a Global selection algorithm from a menu of Global algorithms;
selecting at least one eligible Global multimedia server from said Global metaserver database using said Global selection algorithm;
communicating the name of said at least one eligible Global multimedia server and the identity of said Local metaserver to said client computer;
transferring management responsibility from said Global metaserver to said Local metaserver to separate Global and Local multimedia streams being retrieved by said client computer;
receiving a request by said Local metaserver for a Local multimedia stream from said client computer, wherein said Local multimedia stream includes Local video time stamps;
monitoring the status of each said Local multimedia server and the status of said network;
selecting a Local selection algorithm from a menu of Local algorithms;
selecting at least one eligible Local multimedia server from said Local metaserver database using sa id Local selection algorithm; and
communicating the name of said at least one eligible Local multimedia server to said client computer, wherein said Local video time stamps are matched with said Global video time stamps.

15. The method of claim 1, wherein said at least one metaserver includes a Local metaserver, and wherein said Local metaserver is couple to a Global metaserver, and wherein said Global metaserver and said Local metaserver are at the different level of management, and wherein said Global metaserver includes a Global metaserver database and wherein said Local metaserver includes a Local metaserver database, said method further comprising:
receiving management responsibility from said Global metaserver by said Local metaserver to start sending Local multimedia streams under request of said client computer;
receiving a request by said Local metaserver for a Local multimedia stream from said client computer, wherein said Local multimedia stream includes Local video time stamps;
monitoring the status of each said Local multimedia server and the status of said network;
selecting a Local selection algorithm from a menu of Local algorithms;
selecting at least one eligible Local multimedia server from said Local metaserver database using said Local selection algorithm; and
communicating the name of said at least one eligible Local multimedia server to said client computer, wherein said Local video time stamps are matched with said Global video time stamps.

16. A method for managing a client computer in a computer system, said computer system including a plurality of said client computers coupled to a plurality of multimedia servers and coupled to at least one metaserver at the same level of management via a network, each said metaserver including a metaserver database having information about data streams stored in at least one of the multimedia servers, each said client computer including a video and audio display device, said method comprising:

picking up one said metaserver upon determining that more than one said metaserver is available at the same level of management;

retrieving from the metaserver database a name of at least one eligible multimedia server that stores a requested multimedia stream by said client computer; and connecting said client computer to said at least one eligible multimedia server via said network in order to display said requested multimedia stream on said client computer video and audio display device.

17. The method of claim 16, wherein sending said request for said multimedia stream (Multimedia_X) to said metaserver by one of said client computers (B) further comprises:

sending a request to said first metaserver for an audio stream (Audio_X) including an (Audio_time_X) stamp, wherein at least one said multimedia server has said requested audio stream (Audio_X); and sending a request to said second metaserver for a video stream (Video_X) including a (Video_time_X) stamp, wherein at least one said multimedia server has said requested video stream (Video_X), and wherein said audio stream (Audio_X) is complementary to said video stream (Video_X), and wherein said (Video_time_X) is matched with said (Audio_time_X) stamp.

18. The method of claim 16, wherein said step of sending said request for said multimedia stream (Multimedia_X) to said metaserver by one of said client computers (B) further comprises sending request about the status of (LIVE_X) or (ON_DEMAND_X) of said multimedia content (Multimedia_X) including the waiting time information (WAITING_TIME_LIVE_X) for said at least one multimedia server ($A_X$).

19. The method of claim 16, wherein said metaserver is a Global metaserver and wherein said Global metaserver is coupled to a Local metaserver, and wherein said Global metaserver includes a Global metaserver database and wherein said Local metaserver includes a Local metaserver database, said method further comprising:

sending a request by one of said client computers to said Global metaserver for a Global multimedia stream, wherein said Global multimedia stream includes Global video time stamps;

sending a request by said client computer to said Global metaserver for a Local multimedia stream, wherein said Local multimedia stream includes Local video time stamps;

retrieving the name of at least one eligible Global multimedia server to said client computer from said Global metaserver database, wherein said at least one eligible Global multimedia server includes said requested Global multimedia stream;

retrieving the name of at least one eligible Local multimedia server to said client computer from said Local metaserver database, wherein said at least one eligible Local multimedia server includes said requested Local multimedia stream;

connecting said client computer to said at least one Global multimedia server via said network in order to display requested Global multimedia stream on said client computer video and audio display device; and connecting said client computer (B) to said at least one Local server via said network in order to display said requested Local multimedia stream on said client computer video and audio display device.

20. The method of claim 16, wherein said metaserver includes a Local metaserver, and wherein said Local metaserver is coupled to a Global metaserver, and wherein said Global metaserver includes a Global metaserver database and wherein said Local metaserver includes a Local metaserver database, said method further comprising:

sending a request by one of said client computers to said Local metaserver for a Local multimedia stream, wherein said Local multimedia stream includes Local video time stamps;

retrieving the name of at least one eligible Local multimedia server to said client computer from said Local metaserver database, wherein said at least one eligible Local multimedia server includes said requested Local multimedia stream; and connecting said client computer to said at least one Local server via said network in order to display said requested Local multimedia stream on said client computer video and audio display device.

21. A metaserver useful in association with a plurality of multimedia servers and with a plurality of client computers, said metaserver configured to provide a multimedia server to each said client computer, each said client computer being coupled to said metaserver and to each said multimedia server via a network, each said client computer including a video and audio display device, said metaserver having a metaserver database which includes information about the video data streams stored in at least one of said multimedia servers, said metaserver comprising:

a receiver configured to receive a request for a multimedia stream from one of said client computer by said metaserver;

a monitor configured to continuously monitor the status of each said multimedia server and the status of said network;

a selector configured to select from the metaserver database at least one eligible multimedia server that stores the requested multimedia stream using a selection algorithm; and a transmitter configured to transmit a name of said at least one eligible multimedia server to said client computer.

22. A client computer useful in association with a plurality of multimedia server and with at least one metaserver at the same level of management, said client computer being couple to said plurality of multimedia server and coupled to said at least one metaserver via a network, said at least one metaserver including a metaserver database, said client computer including a video and audio display device, said client computer comprising:

a transmitter configured to transmit a request for a multimedia stream to said at least one metaserver;

a receiver configured to receive from the at least one metaserver database a name of at least one eligible multimedia server that stores the requested multimedia stream;

a selector configured to select the name of at least one of the eligible multimedia servers; and a display device configured to display said requested multimedia stream.

23. A computer-readable storage medium useful in association with at least one metaserver, said at least one metaserver having a processor and a memory, said at least one metaserver managing a plurality of multimedia servers and a plurality of client computers, said at least one metaserver designed to provide a service to each said client computer, each said client computer being coupled to said at least one metaserver and to each said multimedia server via a network, each said client computer including a video and audio display device, said at least one metaserver memory configured to store a metaserver database which includes information about the video data streams stored in at least one of said multimedia servers; said computer-readable storage medium including computer-readable code instructions configured to cause said at least one metaserver to:

receive a request for a multimedia stream from one of said client computers;

continuously monitor the status of each said multimedia server and the status of said network;

select from the at least one metaserver database at least one eligible multimedia server that stores the requested multimedia stream using a selection algorithm; and communicate a name of said at least one eligible multimedia server to said client computer.

24. A computer-readable storage medium useful in association with at least one client computer, each said client computer being coupled to at least one metaserver and to a plurality of multimedia servers via a network, said at least one metaserver having a processor and a memory, said at least one metaserver managing a plurality of multimedia servers and a plurality of client computers, said at least one metaserver designed to provide a service to each said client computer, each said client computer including a video and audio display device, said at least one metaserver memory configured to store a metaserver database which includes information about the video data streams stored in at least one of said multimedia servers; said computer-readable storage medium including computer-readable code instructions configured to cause said client computer to:

pick up one said metaserver upon determining there is more than one said metaserver at the same level of management;

send a request for a multimedia stream to said metaserver by one of said client computers;

retrieve from the metaserver database a name of at least one eligible multimedia server that stores the requested multimedia stream by said client computer; and connect said client computer to said at least one eligible multimedia server via said network in order to display said requested multimedia stream on said client computer video and audio display device.

25. A method comprising:

receiving a request for a multimedia stream from one of a number of client computers;

monitoring the status of each of a number of multimedia servers and the status of a network coupling the number of client computers and the number of multimedia servers;

selecting from a database having information about data streams stored in at least one of the multimedia servers at least one eligible multimedia server storing the requested multimedia stream using a selection algorithm; and communicating a name of said at least one eligible multimedia server to the one of the number of client computers.

26. A metaserver comprising:

a receiver configured to receive a request for a multimedia stream from one of a number of client computers;

a monitor configured to monitor the status of each of a number of multimedia servers and the status of a network coupling the number of client computers and the multimedia servers;

a selector configured to select from a database at least one eligible multimedia server that stores the requested multimedia stream using a selection algorithm; and a transmitter configured to transmit the name of said at least one eligible multimedia server to the one of the number of client computers.

27. A computer comprising:

a transmitter configured to transmit a request for a multimedia stream to a metaserver;

a receiver configured to receive from a database stored on the metaserver a name of at least one eligible multimedia server that stores the requested multimedia stream; and a selector configured to select the name of at least one of the eligible multimedia servers.

28. A method comprising:

transmitting a request for a multimedia stream to a metaserver;

receiving from a database a name of at least one eligible multimedia server that stores the requested multimedia stream, the database having information about data streams stored on at least one multimedia server; and selecting the name of at least one of the eligible multimedia servers.

29. A computer readable medium having computer-executable instructions comprising:

receiving a request for a multimedia stream from one of a number of client computers;

monitoring the status of each of a number of multimedia servers and the status of a network coupling the number of client computers and the number of multimedia servers;

selecting from a database at least one eligible multimedia server that stores the requested multimedia stream using a selection algorithm, the database having information about data streams stored on at least one multimedia server; and communicating a name of said at least one eligible multimedia server to the one of the number of client computers.

30. A computer readable medium having computer-executable instructions comprising:

transmitting a request for a multimedia stream to a metaserver;

receiving from a database a name of at least one eligible multimedia server that stores the requested multimedia stream, the database having information about data streams stored on at least one multimedia server; and selecting the name of at least one of the eligible multimedia servers.

31. A method comprising:

receiving a request for a multimedia stream from one of a number of client computers;

monitoring the status of each of a number of multimedia servers and the status of a network coupling the number of client computers and the number of multimedia servers;

selecting a selection algorithm from a menu of algorithms;

selecting from a database at least one eligible global multimedia server that stores the requested multimedia stream using the selection algorithm;

communicating a name of said at least one eligible global multimedia server and an identity of a local metaserver to the one of the number of client computers; and transferring management responsibility from a global metaserver to the local metaserver.

* * * * *

UNITED STATES PATENT AND TRADEMARK OFFICE
CERTIFICATE OF CORRECTION

PATENT NO. : 6,412,004 B1
DATED : June 25, 2002
INVENTOR(S) : Chen et al.

It is certified that error appears in the above-identified patent and that said Letters Patent is hereby corrected as shown below:

Column 1,
Line 5, replace "expo" with -- exponential increase --.

Column 10,
Line 36, insert -- As was mentioned above, FIG. 9 depicts another embodiment of the present invention, wherein the Local metaserver is under management of the Global one. --

Column 14,
Line 6, insert -- Global -- between "said" and "multimedia".
Line 39, replace "couple" with -- coupled --.

Column 15,
Line 34, insert -- stamp -- between ")" and "is".

Column 16,
Line 4, insert -- said -- after "display".
Line 32, replace "server" with -- service --.
Line 41, replace "computer" with -- computers --.
Line 54, replace "server" with -- servers --.
Line 56, replace "couple" with -- coupled --.
Line 56, replace "server" with -- servers --.

Signed and Sealed this

Twenty-fifth Day of March, 2003

JAMES E. ROGAN
*Director of the United States Patent and Trademark Office*